UNITED STATES PATENT OFFICE.

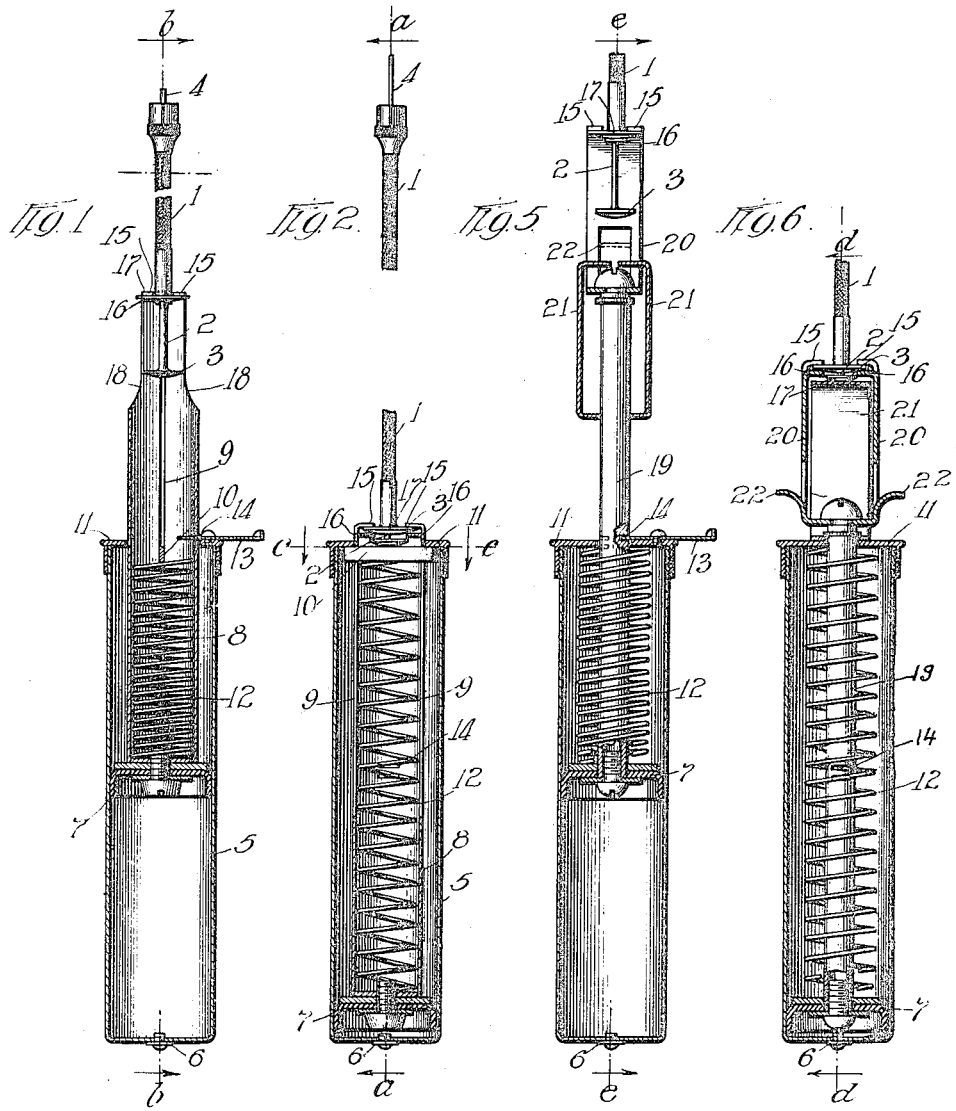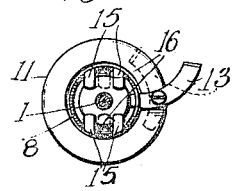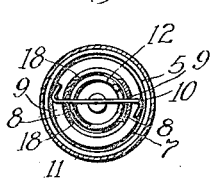

EDGAR E. WEBSTER, OF CHICAGO, ILLINOIS.

AUTOMATIC SHUTTER-TRIPPER.

1,176,008.　　　　　Specification of Letters Patent.　　Patented Mar. 21, 1916.

Application filed December 11, 1914.　Serial No. 876,675.

*To all whom it may concern:*

Be it known that I, EDGAR E. WEBSTER, a citizen of the United States, residing at Chicago, in the county of Cook and State of Illinois, have invented a certain new and useful Improvement in Automatic Shutter-Trippers, of which the following is a full, clear, concise, and exact description, reference being had to the accompanying drawings, forming a part of this specification.

My invention relates to automatic shutter trippers for cameras and has for its object the provision of an improved device of this character by means of which it is possible to cause the automatic tripping of a camera shutter after the elapse of a predetermined time interval so that the operator, for instance, may appear in the picture, or the device of course is of use under other conditions where it would be advisable to have the shutter automatically actuated after the elapse of a certain time interval.

My device is primarily of use in connection with the shutter trippers known as flexible cable release mechanism consisting of a flexible cable having a finger adapted mechanically to control the shutter mechanism so as to cause it to trip, thus to secure the exposure. My automatic mechanism to control this release mechanically engages the free extremity of this flexible cable release to actuate it as stated after the elapse of a certain time interval.

I will explain my invention more in detail by referring to the accompanying drawing illustrating two embodiments thereof, in which—

Figure 1 is a sectional view on line *a—a* of Fig. 2 of my improved device shown in association with a flexible cable release; Fig. 2 is a view on line *b—b* of Fig. 1 showing the device in its operated condition; Fig. 3 is a top view of the device shown in Figs. 1 and 2; Fig. 4 is a sectional view on line *c—c* of Fig. 2; Fig. 5 is a view similar to Fig. 1 on line *d—d* of Fig. 6 showing a modification, and Fig. 6 is a sectional view on line *e—e* of Fig. 5 showing the device in its operated condition.

My improved structure is designed to act upon a flexible cable release mechanism 1 whose structure is well understood in the art and which at its extremity has a plunger 2 provided with a head 3 so arranged that when this plunger is pushed inwardly toward the cable 1, that a finger 4 at the opposite extremity is forced outwardly to actuate the shutter as is well understood. To clarify the flexible cable release mechanism, it is shown in its actuated condition in Fig. 2.

My improved device has means for mechanically controlling the movement of the plunger 2 so that this plunger may be automatically actuated to release the shutter after the elapse of a certain time interval. The structure which I employ to accomplish this result includes a barrel or cylinder 5 having at its lower extremity a screw 6 adapted to control a small opening or bleeder port so that the amount of air issuing therefrom may be controlled to thereby control the speed with which the piston 7 moves so as to permit adjustment or change of the time interval. The piston 7 also has a barrel 8 which is slotted as shown at 9 to permit a cross-piece 10 to remain in a given position irrespective of the movement of said piston. This cross piece 10 is held in place by the screw threaded cap 11 and serves as the abutment for a spring 12, the opposite extremity of which spring bears against the piston 7. The barrel when thus moved upwardly into the position of Fig. 1 compresses the spring 12 so that this spring tends to force the piston into the position of Fig. 2. A catch 13 piston on the cap 11 may enter a notch 14 provided in the barrel 8 so as to hold this device in its set condition. Then when the time comes to permit the device to begin its actuations the catch 13 is released and the spring 12 slowly forces the piston 7 into the position shown in Fig. 2, the speed with which this is accomplished being dependent upon the amount of opening permitted by the screw 6. The barrel 8 at its upper extremity has a plurality of fingers 15, 15 and 16, 16, which are adapted to receive the flange 17 stationarily provided upon the cable 1. The barrel is also cut away as shown at 18 to form a bridge structure including these fingers 15 and 16 so that the plunger 2 and head 3 may be inserted with the flange 17 held between these fingers, all as shown in Fig. 1. Assume then that the catch 13 is released, it will be evident that the spring 12 forces the piston downwardly and keeps on forcing the piston downwardly until the head 3 engages the cross-piece 10, whereupon relative movement between the elements 3 and 17 takes place, resulting finally in a sufficient movement of the pin 4 to trip the shutter. It will be readily understood that the elapsed time may be controlled by the screw 6.

I have thus provided a mechanical structure capable of automatically operating the flexible cable release mechanism.

In Figs. 5 and 6, I have shown a modified structure in which the piston 7 carries a piston rod 19 encircled by the spring 12, the spring acting against the piston at one extremity and the cap 11 at the other extremity. This piston rod carries at its upper extremity a fixedly mounted rectangular shaped bridge structure 20 having fingers 15 and 16 to again hold the flange 17. Within this bridge structure is loosely mounted a similar rectangular structure 21 which in the position shown in Fig. 5 is loosely slidable along the rod 19. It will be seen that when the spring 12 finally begins its actuation, the structure 21 first engages the cap 11 and is then held in position against further movement downwardly, while the structure 20 still continues its downward movement so that the upper loose portions of the structure 21 will engage the head 3 and push it inwardly, finally reaching the position shown in Fig. 6 to cause a tripping of the shutter. The structure 21 has finger pieces 22, 22 to permit pulling out the device into the position shown in Fig. 5 so that the catch 13 may be set, whereupon the structure 21 is permitted to drop into the position shown in Fig. 5 to permit of the flexible cable release mechanism being inserted.

From what has been thus described the nature of the invention will be readily clear, but

Having thus described various forms which my invention may take, what I claim as new and desire to secure by Letters Patent is:

A shutter tripper comprising mechanism for mechanically engaging and controlling the tripping device of a shutter, said mechanism including clamping elements for engaging the relatively movable extremities of one end of a flexible cable release mechanism, and slow acting means to automatically control said mechanism and actuate the same after the elapse of a predetermined time interval, said means including a cylinder, a piston, a piston rod, a spring for actuating said piston, said cylinder and piston forming a pneumatic chamber, means for controlling the efflux of fluid from said chamber, and a loosely mounted bridge piece carried by said piston rod forming part of said clamping elements.

In witness whereof, I hereunto subscribe my name this third day of December, A. D. 1914.

EDGAR E. WEBSTER.

Witnesses:
MAX W. ZABEL,
HAZEL A. JONES.